(12) United States Patent
Fujihara et al.

(10) Patent No.: US 9,527,055 B2
(45) Date of Patent: Dec. 27, 2016

(54) HYDROGEN GENERATOR AND FUEL CELL SYSTEM

(71) Applicant: PANASONIC CORPORATION, Osaka (JP)

(72) Inventors: Seiji Fujihara, Osaka (JP); Tomoyuki Nakajima, Hyogo (JP); Chie Harada, Osaka (JP); Takahiro Kusuyama, Osaka (JP); Hidenobu Wakita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

(21) Appl. No.: 14/240,245

(22) PCT Filed: Jun. 21, 2013

(86) PCT No.: PCT/JP2013/003891
§ 371 (c)(1),
(2) Date: Feb. 21, 2014

(87) PCT Pub. No.: WO2013/190851
PCT Pub. Date: Dec. 27, 2013

(65) Prior Publication Data

US 2014/0212775 A1     Jul. 31, 2014

(30) Foreign Application Priority Data

Jun. 22, 2012 (JP) ................................. 2012-140501

(51) Int. Cl.
*H01M 8/06* (2016.01)
*B01J 12/00* (2006.01)
(Continued)

(52) U.S. Cl.
CPC ............... *B01J 12/00* (2013.01); *B01J 8/0465* (2013.01); *C01B 3/38* (2013.01); *C01B 3/48* (2013.01);
(Continued)

(58) Field of Classification Search
None
See application file for complete search history.

(56) References Cited

U.S. PATENT DOCUMENTS

2006/0199051 A1*  9/2006  Bai .................. H01M 8/04007
                                                         429/425
2009/0087705 A1   4/2009  Fuju et al.
2012/0237839 A1   9/2012  Fuju et al.

FOREIGN PATENT DOCUMENTS

JP   2003-165709 A    6/2003
JP   2006-199546 A    8/2006
(Continued)

OTHER PUBLICATIONS

International Search Report issued in International Application No. PCT/JP2013/003891 mailed Sep. 24, 2013, with English translation, 4 pgs.

*Primary Examiner* — Patrick Ryan
*Assistant Examiner* — Wyatt McConnell
(74) *Attorney, Agent, or Firm* — McDermott Will & Emery LLP (57) ABSTRACT

A hydrogen generator includes a reformer configured to cause a reforming reaction using a material and steam to generate a hydrogen-containing gas; a shift converter configured to reduce CO in the hydrogen-containing gas by a shift reaction; an evaporator provided adjacent to the shift converter so as to perform heat exchange with an upstream side of the shift converter and configured to evaporate water; and a hydro-desulfurizer provided adjacent to the shift converter so as to perform heat exchange with a downstream
(Continued)

side of the shift converter and configured to remove a sulfur compound in the material by a hydrodesulfurization reaction.

8 Claims, 6 Drawing Sheets

(51) Int. Cl.
  *C01B 3/38* (2006.01)
  *C01B 3/48* (2006.01)
  *B01J 8/04* (2006.01)
(52) U.S. Cl.
  CPC ......... *H01M 8/0618* (2013.01); *H01M 8/0668* (2013.01); *H01M 8/0675* (2013.01); *B01J 2208/0053* (2013.01); *B01J 2208/00504* (2013.01); *C01B 2203/0233* (2013.01); *C01B 2203/0244* (2013.01); *C01B 2203/0283* (2013.01); *C01B 2203/0288* (2013.01); *C01B 2203/044* (2013.01); *C01B 2203/0445* (2013.01); *C01B 2203/066* (2013.01); *C01B 2203/0894* (2013.01); *C01B 2203/1058* (2013.01); *C01B 2203/1064* (2013.01); *C01B 2203/1076* (2013.01); *C01B 2203/127* (2013.01); *C01B 2203/1288* (2013.01); *C01B 2203/82* (2013.01); *Y02E 60/50* (2013.01)

(56) References Cited

FOREIGN PATENT DOCUMENTS

| | | |
|---|---|---|
| JP | 2009-078954 A | 4/2009 |
| JP | 2009-256120 A | 11/2009 |
| JP | 2011-207713 A | 10/2011 |
| JP | 2011-207715 A | 10/2011 |
| JP | 2011-207727 A | 10/2011 |
| JP | 2012-041238 A | 3/2012 |
| JP | 2012-240893 A | 12/2012 |

* cited by examiner

HYDROGEN GENERATOR AND FUEL CELL SYSTEM

RELATED APPLICATIONS

This application is the U.S. National Phase under 35 U.S.C. §371 of International Application No. PCT/JP2013/003891, filed on filed Jun. 21, 2013, which in turn claims the benefit of Japanese Application No. 2012-140501, filed on Jun. 22, 2012, the disclosures of which are incorporated by reference herein.

TECHNICAL FIELD

The present invention relates to a hydrogen generator and a fuel cell system.

BACKGROUND ART

An infrastructure for supplying a hydrogen-containing gas used as a fuel at the time of power generation is not being developed as a typical material infrastructure, so that a fuel cell system typically includes a hydrogen generator including a reformer configured to generate a hydrogen-containing gas from a natural gas or LPG supplied from the typical material infrastructure.

A sulfur compound as an odorant may be added to the natural gas or LPG supplied from the typical material infrastructure, and the natural gas or LPG may originally contain a sulfur compound. Since the sulfur compound often poisons the catalyst that generates the hydrogen-containing gas, an adsorptive desulfurization catalyst or a hydrodesulfurization catalyst is provided upstream of the catalyst that generates the hydrogen-containing gas, to remove the sulfur compound. In many cases, the hydrodesulfurization catalyst having a high adsorption capacity and capable of realizing maintenance free is included in the hydrogen generator.

To generate the hydrogen-containing gas from the natural gas or the LPG, a steam-reforming reaction is typically used. In the steam-reforming reaction, for example, a city gas and steam that are materials are caused to react with each other at a high temperature of about 600° C. to 700° C. by using a precious metal-based reforming catalyst, such as a Ni-based reforming catalyst or a Ru-based reforming catalyst. Thus, the hydrogen-containing gas containing hydrogen as a major component is generated.

The hydrogen-containing gas contains CO (carbon monoxide), and the CO poisons a fuel cell to reduce the voltage of the fuel cell. Therefore, for example, a Cu-based shift catalyst is provided downstream of the reforming catalyst to reduce the CO by a water gas shift reaction. To further reduce the CO, a Ru-based or Pt-based selective oxidation catalyst or a Ni-based or Ru-based methanation catalyst is provided to reduce the CO to several hundred ppm to several ppm.

PTL 1 discloses a shift reaction portion including a high-temperature shift reaction portion configured to perform a high-temperature shift reaction that is a shift reaction at high temperatures (for example, 400° C. to 600° C.) and a low-temperature shift reaction portion configured to perform a low-temperature shift reaction that is a shift reaction at temperatures (for example, 150° C. to 350° C.) lower than the temperatures of the high-temperature shift reaction (paragraph 0023). In the low-temperature shift reaction portion, a reformed gas supplied through an upper side of an outer peripheral portion of the low-temperature shift reaction portion is caused to flow to a lower portion of the outer peripheral portion and then turns around to return through an inner peripheral portion of the low-temperature shift reaction portion to an upper portion of the low-temperature shift reaction portion to be introduced to the low-temperature shift catalyst portion (paragraph 0037).

CITATION LIST

Patent Literature

PTL 1: Japanese Laid-Open Patent Application Publication No. 2011-207727

SUMMARY OF INVENTION

Technical Problem

However, according to the conventional hydrogen generators, the utilization of heat of a high-temperature portion in the shift converter and the utilization of heat of a low-temperature portion in the shift converter have not been adequately studied. Especially in the case of using the hydrodesulfurization catalyst as the desulfurizer, the utilization of heat is not necessarily considered.

The present invention was made to solve the above conventional problems and provides a hydrogen generator capable of generating hydrogen more efficiently than the conventional hydrogen generators.

Solution to Problem

To be specific, in order to solve the above problems, a hydrogen generator of the present invention includes: a reformer configured to cause a reforming reaction using a material and steam to generate a hydrogen-containing gas; a shift converter configured to reduce CO in the hydrogen-containing gas by a shift reaction; an evaporator provided adjacent to the shift converter so as to perform heat exchange with an upstream side of the shift converter and configured to evaporate water; and a hydro-desulfurizer provided adjacent to the shift converter so as to perform heat exchange with a downstream side of the shift converter and configured to remove a sulfur compound in the material by a hydrodesulfurization reaction.

In addition, a fuel cell system of the present invention includes the above hydrogen generator and a fuel cell configured to generate electric power using the hydrogen-containing gas supplied from the hydrogen generator.

Advantageous Effects of Invention

Since one aspect of the present invention includes the above features, the temperature gradient of the hydro-desulfurizer becomes more moderate than before, and the hydro-desulfurizer is easily maintained at an appropriate temperature.

DESCRIPTION OF EMBODIMENTS

Findings on which Present Invention was Based

As described in the above conventional art, the shift converter has a temperature gradient in which an upstream side is high in temperature, and a downstream side is low in temperature. Therefore, in the case of performing the heat exchange between the shift converter and the hydro-desulfurizer, the hydro-desulfurizer that performs heat exchange with the shift converter tends to have a temperature gradient. If the temperature gradient occurs at the hydro-desulfurizer, the temperature of the hydrodesulfurization catalyst does not become an appropriate temperature, and the concentration of the sulfur compound in the material gas having flowed through the hydro-desulfurizer tends to increase.

At the high-temperature upstream side of the shift converter, a reaction rate is high, a CO concentration of the hydrogen-containing gas is high, and a shift reaction amount is large. Therefore, the shift reaction of most of the CO in the hydrogen-containing gas occurs. On this account, the amount of heat generated becomes large, and the temperature gradient also becomes high. At the low-temperature downstream side of the shift converter, the reaction rate is relatively low, and the CO concentration of the hydrogen-containing gas is also low. Therefore, the CO shift reaction amount is small, and the amount of heat generated is also small. On this account, the temperature gradient becomes moderate.

Here, regarding the heat exchange between the shift converter and the hydro-desulfurizer, the hydro-desulfurizer is configured so as to perform heat exchange mainly with a downstream side of the shift converter. With this, the temperature gradient of the hydro-desulfurizer becomes moderate, and the hydro-desulfurizer is maintained at an appropriate temperature more easily than the conventional hydrogen generators.

In a case where the adjustment of the heat amount by a cooling mechanism at the upstream side of the shift converter at which the amount of heat generated is large is not performed, the hydrogen-containing gas that is high in temperature beyond necessity flows from the upstream side of the shift converter to the downstream side thereof, and this may become a cause of the generation of the temperature gradient at the downstream side of the shift converter. Here, by causing the heat exchange between at least the upstream side of the shift converter and the evaporator, the heat of the upstream side of the shift converter is effectively utilized to heat the evaporator whose temperature gradient does not have to be considered, and the generation of the temperature gradient at the downstream side of the shift converter is prevented.

The following embodiments are made based on these findings.

Embodiment 1

A hydrogen generator of Embodiment 1 includes: a reformer configured to cause a reforming reaction using a material and steam to generate a hydrogen-containing gas; a shift converter configured to reduce CO in the hydrogen-containing gas by a shift reaction; an evaporator provided adjacent to the shift converter so as to perform heat exchange with an upstream side of the shift converter and configured to evaporate water; and a hydro-desulfurizer provided adjacent to the shift converter so as to perform heat exchange with a downstream side of the shift converter and configured to remove a sulfur compound in the material by a hydrodesulfurization reaction.

The hydrogen generator of Embodiment 1 may include: a reformer configured to cause a reforming reaction using a material and steam to generate a hydrogen-containing gas; a shift converter configured to reduce CO in the hydrogen-containing gas by a shift reaction; an evaporator provided adjacent to the shift converter so as to perform heat exchange with at least an upstream side of the shift converter and configured to evaporate water; and a hydro-desulfurizer provided adjacent to the shift converter so as to perform heat exchange mainly with a downstream side of the shift converter when performing heat exchange with the shift converter and configured to remove a sulfur compound in the material by a hydrodesulfurization reaction.

Figure 1:
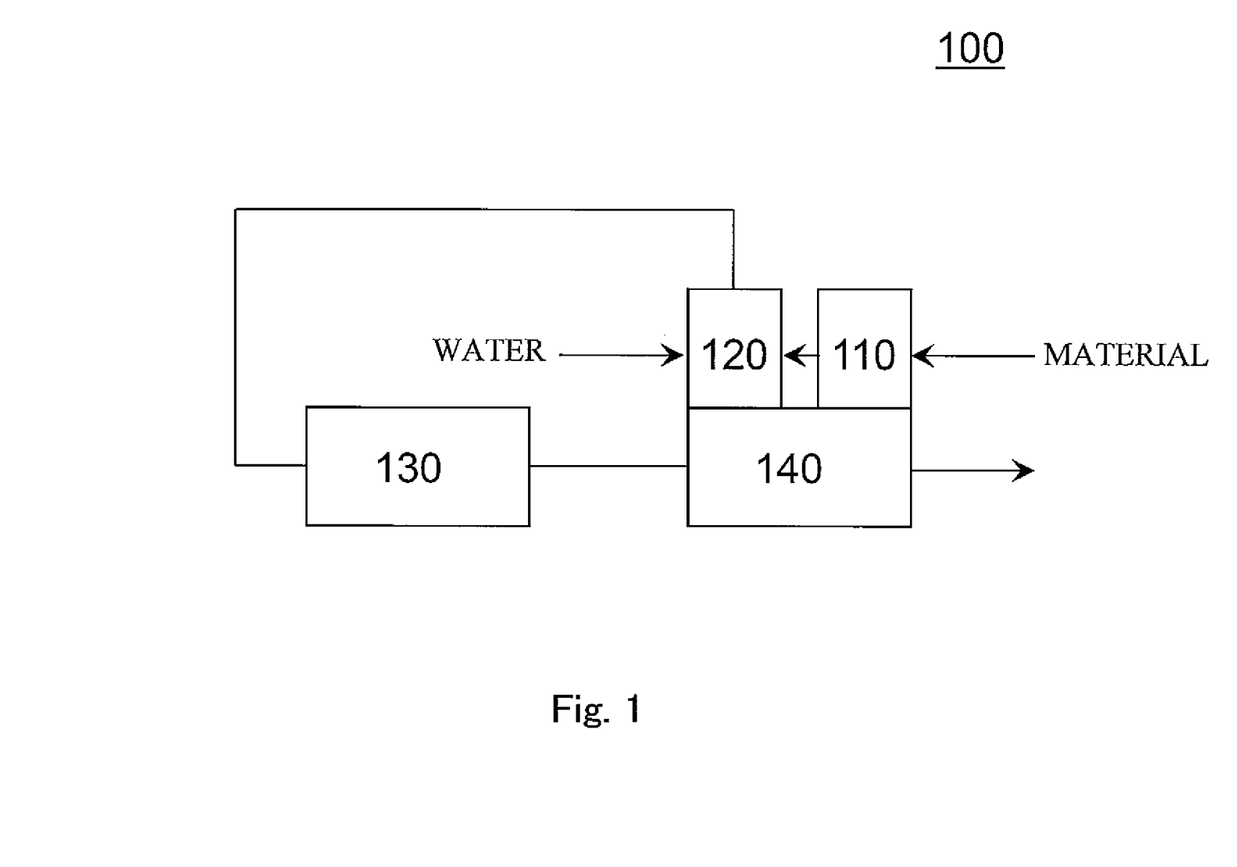
FIG. 1 is a conceptual diagram showing one example of a schematic configuration of a hydrogen generator according to Embodiment 1.

FIG. 1 is a conceptual diagram showing one example of a schematic configuration of a hydrogen generator 100 according to Embodiment 1.

The hydrogen generator 100 according to Embodiment 1 includes: a reformer 130 configured to cause a reforming reaction using a material and steam to generate a hydrogen-containing gas; a shift converter 140 configured to reduce CO in the hydrogen-containing gas by a shift reaction; an evaporator 120 provided adjacent to the shift converter 140 so as to perform heat exchange with an upstream side of the shift converter 140 and configured to evaporate water; and a hydro-desulfurizer 110 provided adjacent to the shift converter 140 so as to perform heat exchange with a downstream side of the shift converter 140 and configured to remove a sulfur compound in the material by a hydrodesulfurization reaction.

With this configuration, the temperature gradient of the hydro-desulfurizer becomes more moderate than those of the conventional hydrogen generators, and the hydro-desulfurizer is easily maintained at an appropriate temperature.

Here, the "upstream side of the shift converter 140" denotes an upstream side regarding the flow of the material flowing through the shift converter 140, and the "downstream side" of the shift converter 140 denotes a downstream side regarding the flow of the material flowing through the shift converter.

To be specific, in the present embodiment, the evaporator 120 and the upstream side of the shift converter 140 are located adjacent to each other.

With this, the heat generated by the shift reaction in the shift converter 140 can be transferred to the evaporator 120, and the hydrogen can be efficiently generated. To be specific, since the reaction heat by the shift reaction in the shift converter 140 can be used for the evaporation of water in the evaporator, the heat efficiency of the hydrogen generator can be improved.

In addition, in the present embodiment, the downstream side of the shift converter 140 and the hydro-desulfurizer 110 are located adjacent to each other. As described above, to maintain the hydro-desulfurizer 110 at an appropriate temperature, the hydro-desulfurizer 110 needs to perform heat exchange with a medium having a low temperature gradient whereas the temperature gradient of the upstream side of the shift converter 140 becomes high, and the temperature gradient of the downstream side thereof becomes moderate. Therefore, since the downstream side of the shift converter 140 and the hydro-desulfurizer 110 are provided adjacent to each other, the hydro-desulfurizer 110 can perform heat exchange with the medium having a low temperature gradient. With this, the hydro-desulfurizer 110 can be maintained at an appropriate temperature.

The hydrogen generator 100 according to Embodiment 1 may include: the reformer 130 configured to cause the reforming reaction using the material and steam to generate the hydrogen-containing gas; the shift converter 140 configured to reduce the CO in the hydrogen-containing gas by the shift reaction; the evaporator 120 provided adjacent to the shift converter 140 so as to perform heat exchange with at least the upstream side of the shift converter 140 and configured to evaporate water; and the hydro-desulfurizer 110 provided adjacent to the shift converter 140 so as to perform heat exchange mainly with the downstream side of the shift converter 140 when performing heat exchange with the shift converter 140 and configured to remove the sulfur compound in the material by the hydrodesulfurization reaction.

Here, the expression "provided adjacent to the shift converter 140 so as to perform heat exchange mainly with the downstream side of the shift converter 140 when performing heat exchange with the shift converter 140" denotes that the area of a surface of the hydro-desulfurizer 110 which surface is located adjacent to the shift converter 140 so as to perform heat exchange with the downstream side of the shift converter 140 is relatively larger than the area of a surface of the hydro-desulfurizer 110 which surface is located adjacent to the shift converter 140 to perform heat exchange with the upstream side of the shift converter 140.

Next, one example of the hydrogen generator 100 according to Embodiment 1 will be explained.

Device Configuration

As shown in FIG. 1, the hydrogen generator 100 according to Embodiment 1 includes the hydro-desulfurizer 110, the evaporator 120, the reformer 130, and the shift converter 140.

The hydro-desulfurizer 110 is provided adjacent to the shift converter 140 so as to perform heat exchange with the downstream side of the shift converter 140 and removes the sulfur compound in the material by the hydrodesulfurization reaction. For example, used as the hydrodesulfurization agent is a CuZn-based catalyst having both a function of converting the sulfur compound into hydrogen sulfide and a function of adsorbing the hydrogen sulfide. However, the hydrodesulfurization agent is not limited to the present embodiment and may be constituted by a CoMo-based catalyst that converts the sulfur compound in the material gas into the hydrogen sulfide and a ZnO-based catalyst or CuZn-based catalyst that is a sulfur compound adsorbent provided downstream of the CoMo-based catalyst to adsorb and remove the hydrogen sulfide.

The material gas having flowed through the hydro-desulfurizer 110 may be mixed with water to flow through the evaporator 120. The material gas may flow through the reformer 130 after having flowed through the evaporator 120.

The evaporator 120 may be just a space. However, to increase the area for the heat exchange, the evaporator 120 may have a spiral structure. The area for the heat exchange may be increased by providing filling materials, such as alumina balls or silica balls, which do not directly contribute to the reaction between the material gas and the water.

The reformer 130 generates the hydrogen-containing gas from the material gas. Specifically, the steam-reforming reaction between the material gas and the water proceeds on the reforming catalyst in the reformer 130 to generate the hydrogen-containing gas. Typically, the Ni-based, Ru-based, or Pt-based catalyst may be used as the reforming catalyst. The reforming reaction may be any reaction as long as it uses the material and the steam. Examples of the reforming reaction include a steam-reforming reaction and an autothermal reaction. In a case where the reforming reaction is the autothermal reaction, the hydrogen generator 100 further includes an air supply unit (not shown) configured to supply air to the reformer 130.

The material gas is a gas containing an organic compound constituted by at least carbon and hydrogen, and examples thereof include a city gas containing methane as a major component, a natural gas, and a LPG The shift converter 140 configured to reduce the CO in the hydrogen-containing gas generated by the reformer 130 is provided downstream of the reformer 130. For example, a CuZn-based catalyst is used as a shift catalyst and causes the shift reaction between the CO in the hydrogen-containing gas and the steam to reduce the CO. However, the shift catalyst is not limited to the present embodiment and may be constituted by a Fe-based catalyst or a precious metal-based catalyst.

A space may be provided between the evaporator 120 and the upstream side of the shift converter 140. Even in this case, the heat from the upstream side of the shift converter 140 can be transferred through the space to the evaporator 120. Therefore, an effect of improving the heat efficiency of the hydrogen generator is obtained. A fluid that is higher in temperature than the fluid flowing through the upstream side of the shift converter 140 and the evaporator 120 may flow through this space. Even in this case, the heat can be transferred from this space to the fluid flowing through the shift converter 140 and the evaporator 120, so that the heat can be efficiently utilized.

Generally, the amount of heat generated by the shift reaction caused in the shift converter 140 is larger than the amount of heat generated in the hydro-desulfurizer 110. Especially, in a case where the amount of temperature decrease of the hydro-desulfurizer 110 is large, the amount of reaction heat at a downstream portion of the shift converter 140 may become larger than the amount of reaction heat at the hydro-desulfurizer 110. The reaction heat at the shift converter 140 can be suitably set by, for example, adjusting the amount of catalysts in the shift converter.

The hydrogen generator 100 shown in FIG. 1 is configured such that the evaporator 120 performs heat exchange only with the upstream side of the shift converter 140. However, the evaporator 120 may be provided adjacent to the shift converter 140 so as to perform heat exchange with at least the upstream side of the shift converter 140. For example, the evaporator 120 may be configured so as to perform heat exchange with not only the upstream side of the shift converter 140 but also the downstream side of the shift converter 140.

In the hydrogen generator 100 shown in FIG. 1, the hydro-desulfurizer 110 is provided adjacent to the shift converter 140 so as to perform heat exchange only with the downstream side of the shift converter 140. However, as long as the hydro-desulfurizer 110 is configured so as to perform heat exchange mainly with the downstream side of the shift converter 140 when performing heat exchange with the shift converter 140, the hydro-desulfurizer 110 may be provided adjacent to the shift converter 140 so as to perform heat exchange with not only the downstream side of the shift converter 140 but also a part of the upstream side of the shift converter 140. In this case, the hydro-desulfurizer 110 may be configured not to perform heat exchange with a portion of the upstream side of the shift converter 140, the portion having a temperature (for example, 300° C.) at which carbon deposition from the material occurs in the hydro-desulfurizer. Further, in this case, the hydro-desulfurizer 110 may be configured not to perform heat exchange with a portion of the upstream side of the shift converter 140, the portion having a temperature (for example, 350° C.) at which a methanation reaction of carbon monoxide or carbon dioxide in a recycled gas proceeds in the hydro-desulfurizer.

Embodiment 2

The hydrogen generator of Embodiment 2 is configured such that the hydrogen generator of Embodiment 1 further includes a CO remover configured to reduce the CO in the hydrogen-containing gas having flowed through the shift converter, by at least one of a methanation reaction and an oxidation reaction, wherein: the shift converter includes a first shift converter located at the upstream side and a second shift converter located at the downstream side; and the hydrogen-containing gas having flowed through the first shift converter performs heat exchange with the evaporator and the CO remover in this order and then flows through the second shift converter.

Figure 2:
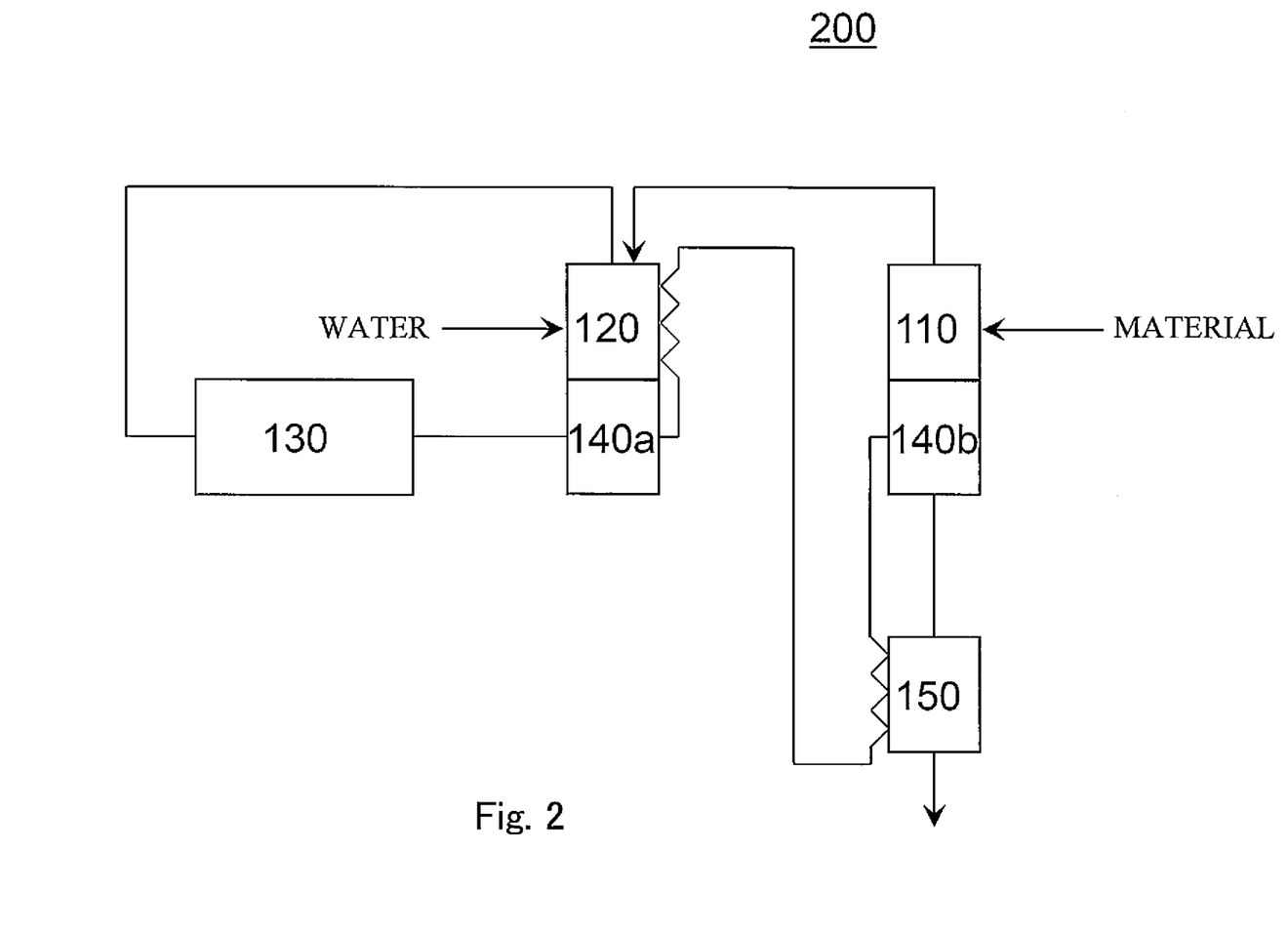
FIG. 2 is a conceptual diagram showing one example of a schematic configuration of the hydrogen generator according to Embodiment 2.

FIG. 2 is a conceptual diagram showing one example of a schematic configuration of a hydrogen generator 200 according to Embodiment 2.

In addition to the components of the hydrogen generator of Embodiment 1, the hydrogen generator according to Embodiment 2 further includes a CO remover 150 configured to reduce the CO in the hydrogen-containing gas having flowed through the shift converter 140, by at least one of the methanation reaction and the oxidation reaction. The shift converter includes a first shift converter 140a located at the upstream side and a second shift converter 140b located at the downstream side. The hydrogen-containing gas having flowed through the first shift converter 140a performs heat exchange with the evaporator 120 and the CO remover 150 in this order and then flows through the second shift converter 140b.

With this configuration, it becomes easy to stably reduce the CO in the hydrogen generator, and a start-up time of the hydrogen generator can be shortened.

To be specific, the shift converter according to the present embodiment is being divided into the first shift converter 140a located at the upstream side and the second shift converter 140b located at the downstream side.

With this configuration, temperatures can be distributed such that the reaction rate is increased by setting the upstream-side first shift converter 140a at higher temperatures, and the CO concentration is decreased in a chemical equilibrium manner by setting the downstream-side second shift converter 140b at lower temperatures. Thus, it becomes easy to stably reduce the CO in the hydrogen generator 200.

In the present embodiment, the CO remover 150 is located at an extreme downstream side in the hydrogen generator 200. Therefore, especially at the time of the start-up of the hydrogen generator, it takes time to increase the temperature of a CO removing catalyst filled in the CO remover 150 up to a temperature appropriate for the reaction. On the other hand, the temperature of the first shift converter 140a increases more easily and becomes higher than the temperature of the CO remover 150. Here, the start-up time of the hydrogen generator 200 can be shortened by transferring to the CO removing catalyst the heat of the hydrogen-containing gas having flowed through the first shift converter 140a.

Device Configuration

The hydrogen generator 200 according to Embodiment 2 includes the hydro-desulfurizer 110, the evaporator 120, the reformer 130, the first shift converter 140a, the second shift converter 140b, and the CO remover 150.

Each of the first shift converter 140a and the second shift converter 140b may be configured in the same manner as the above-described shift converter 140. The shift catalyst filled in the first shift converter 140a and the shift catalyst filled in the second shift converter 140b may be different in type from each other.

The CO remover 150 is provided with at least one of a selective oxidation catalyst and a methanation catalyst. Generally, the CO concentration of the hydrogen-containing gas having flowed through the shift converter is about several thousand ppm. Therefore, the CO concentration can be further reduced to several hundred ppm to several ppm.

A Ru-based or Pt-based catalyst may be used as the selective oxidation catalyst, and an air supply unit (not shown) configured to supply air may be provided between the second shift converter 140b and the CO remover 150. The CO concentration may be reduced to several hundred ppm to several ppm by causing the reaction between the CO in the hydrogen-containing gas and oxygen in the air. A Ru-based or Ni-based catalyst may be used as the methanation catalyst. The air supply unit is not required, and the CO concentration may be reduced to several hundred ppm to several ppm by the reaction between the CO in the hydrogen-containing gas and the hydrogen.

Embodiment 2 can be modified in the same manner as Embodiment 1.

Modification Example 1

The hydrogen generator according to Modification Example 1 is configured such that in the hydrogen generator of Embodiment 1, the hydrogen-containing gas having flowed through the first shift converter performs heat exchange with the CO remover and the hydrogen-containing gas, having not yet flowed into the CO remover, in this order and then flows through the second shift converter.

Figure 3:
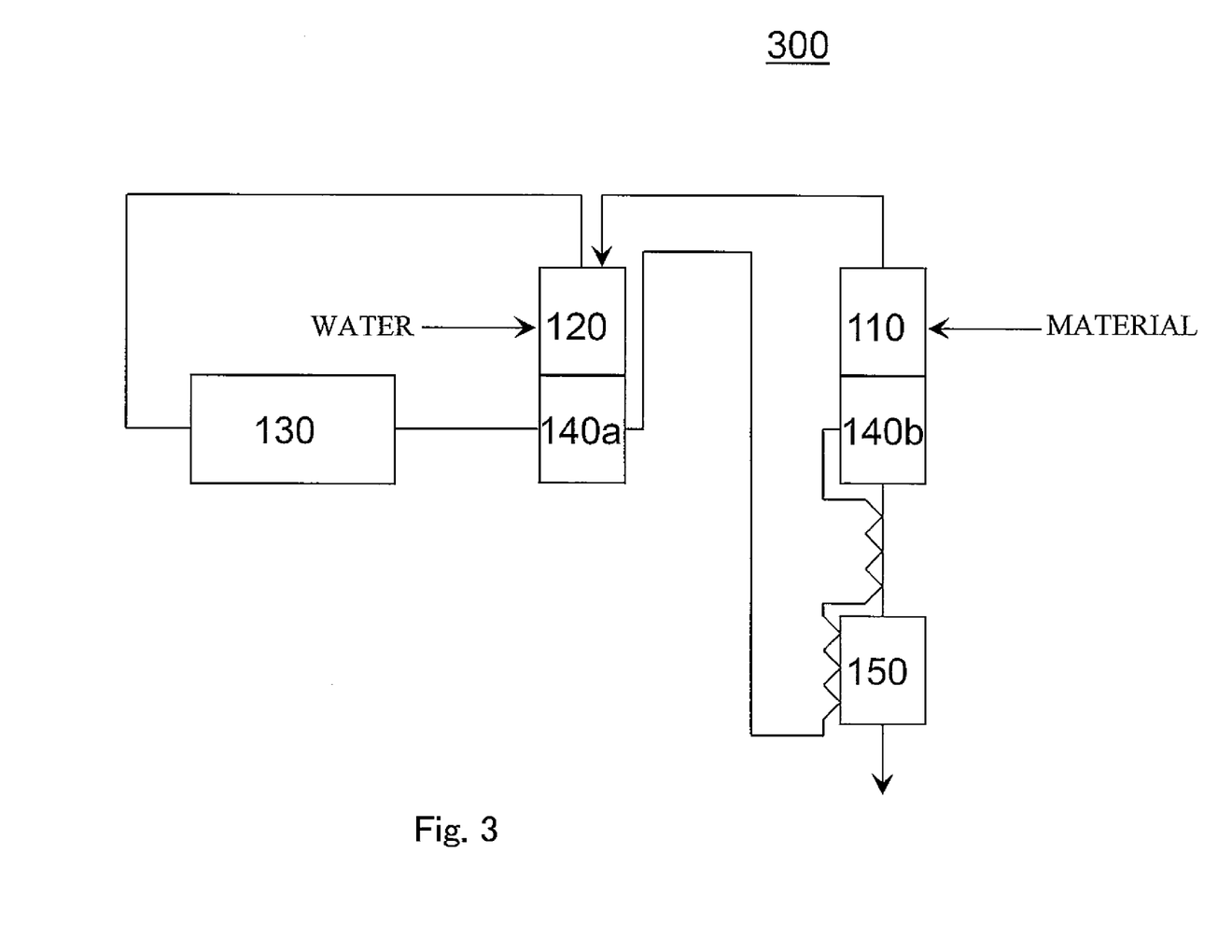
FIG. 3 is a conceptual diagram showing one example of a schematic configuration of the hydrogen generator according to Modification Example 1 of Embodiment 2.

FIG. 3 is a conceptual diagram showing one example of a schematic configuration of a hydrogen generator 300 according to Modification Example 1.

In the hydrogen generator 300 according to Modification Example 1, unlike the hydrogen generator 200 of Embodiment 2, the hydrogen-containing gas having flowed through the first shift converter 140a performs heat exchange with the CO remover 150 and the hydrogen-containing gas, having not yet flowed into the CO remover 150, in this order and then flows through the second shift converter 140b.

With this configuration, the hydrogen generator 300 according to Modification Example 1 can obtain the same effects as the hydrogen generator 200 according to Embodiment 2.

Modification Example 1 can be modified in the same manner as Embodiment 1.

Modification Example 2

The hydrogen generator according to Modification Example 2 is configured such that in the hydrogen generator of Embodiment 1, the hydrogen-containing gas having flowed through the first shift converter performs heat exchange with the evaporator, the CO remover, and the hydrogen-containing gas, having not yet flowed into the CO remover, in this order and then flows through the second shift converter.

Figure 4:
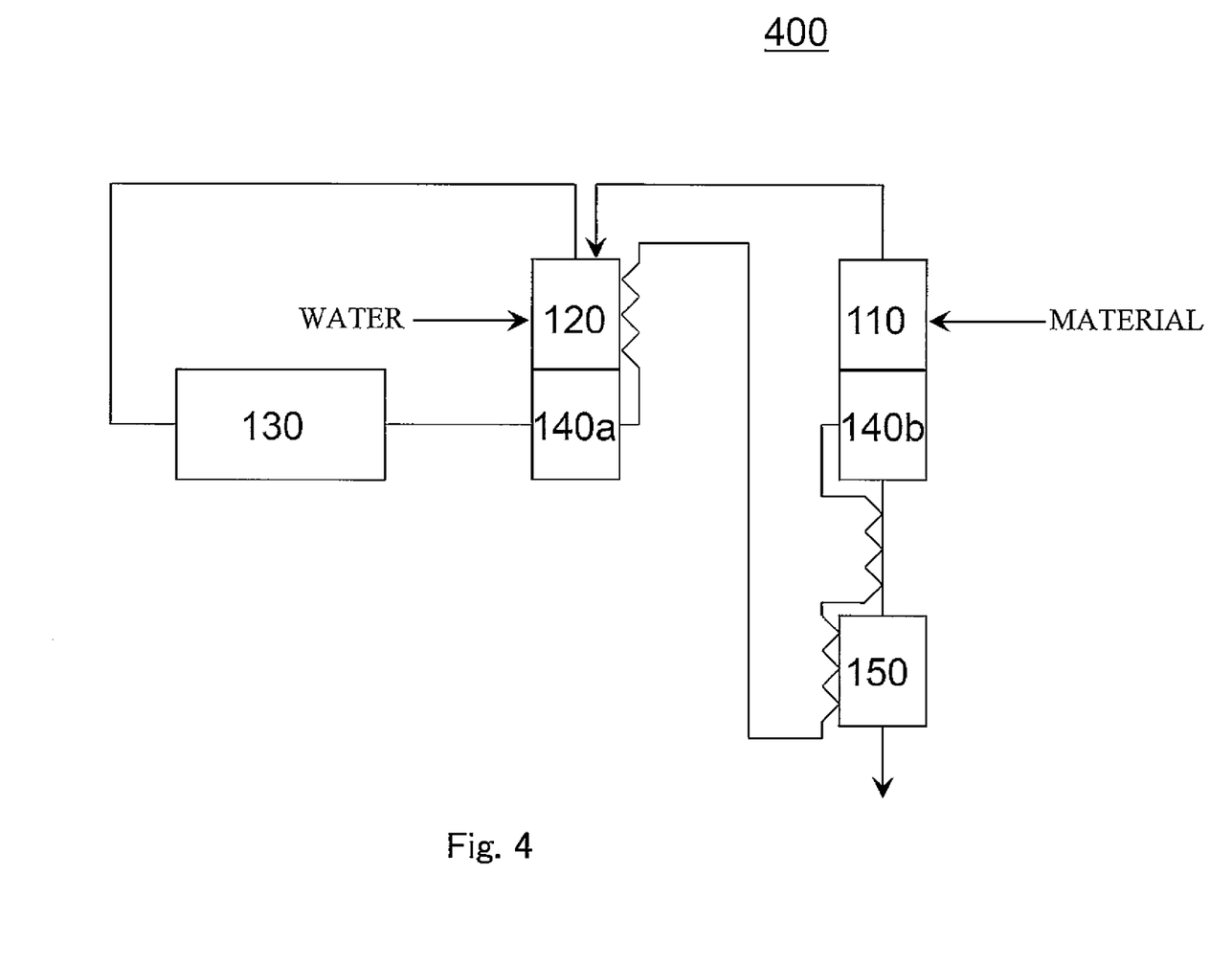
FIG. 4 is a conceptual diagram showing one example of a schematic configuration of the hydrogen generator according to Modification Example 2 of Embodiment 2.

FIG. 4 is a conceptual diagram showing one example of a schematic configuration of a hydrogen generator 400 according to Modification Example 2.

In the hydrogen generator 400 according to Modification Example 2, unlike the hydrogen generator of Embodiment 2, the hydrogen-containing gas having flowed through the first shift converter 140a performs heat exchange with the evaporator 120, the CO remover 150, and the hydrogen-containing gas, having not yet flowed into the CO remover 150, in this order and then flows through the second shift converter 140b.

With this configuration, since a gas passage extending from the shift converter to the CO remover is kept warm, the dew condensation in this gas passage is reduced, and the warm-up of the CO remover at the time of the start-up is quickly completed. Therefore, the start-up time of the hydrogen generator 400 can be shortened. Since the gas having flowed through the first shift converter 140a performs heat exchange with the evaporator 120, the CO remover 150, and the hydrogen-containing gas, having not yet flowed through the CO remover 150, in this order, the heat efficiency can be improved more than the hydrogen generators described in Embodiment 2 and Modification Example 1.

Modification Example 2 can be modified in the same manner as Embodiment 1.

Embodiment 3

The hydrogen generator according to Embodiment 3 is configured such that the hydrogen generator of Embodiment 2 further includes a heater, wherein the hydro-desulfurizer is provided so as to be located between the heater and the second shift converter.

The above hydrogen generator may be configured such that: the hydro-desulfurizer is configured in a circular shape; the heater is provided at an inner periphery side of the hydro-desulfurizer; and the second shift converter is provided at an outer periphery side of the hydro-desulfurizer.

The above hydrogen generator may be configured such that: the second shift converter is configured in a circular shape; and a passage through which the hydrogen-containing gas having flowed through the second shift converter flows is provided at an outer periphery side of the second shift converter.

Figure 5:
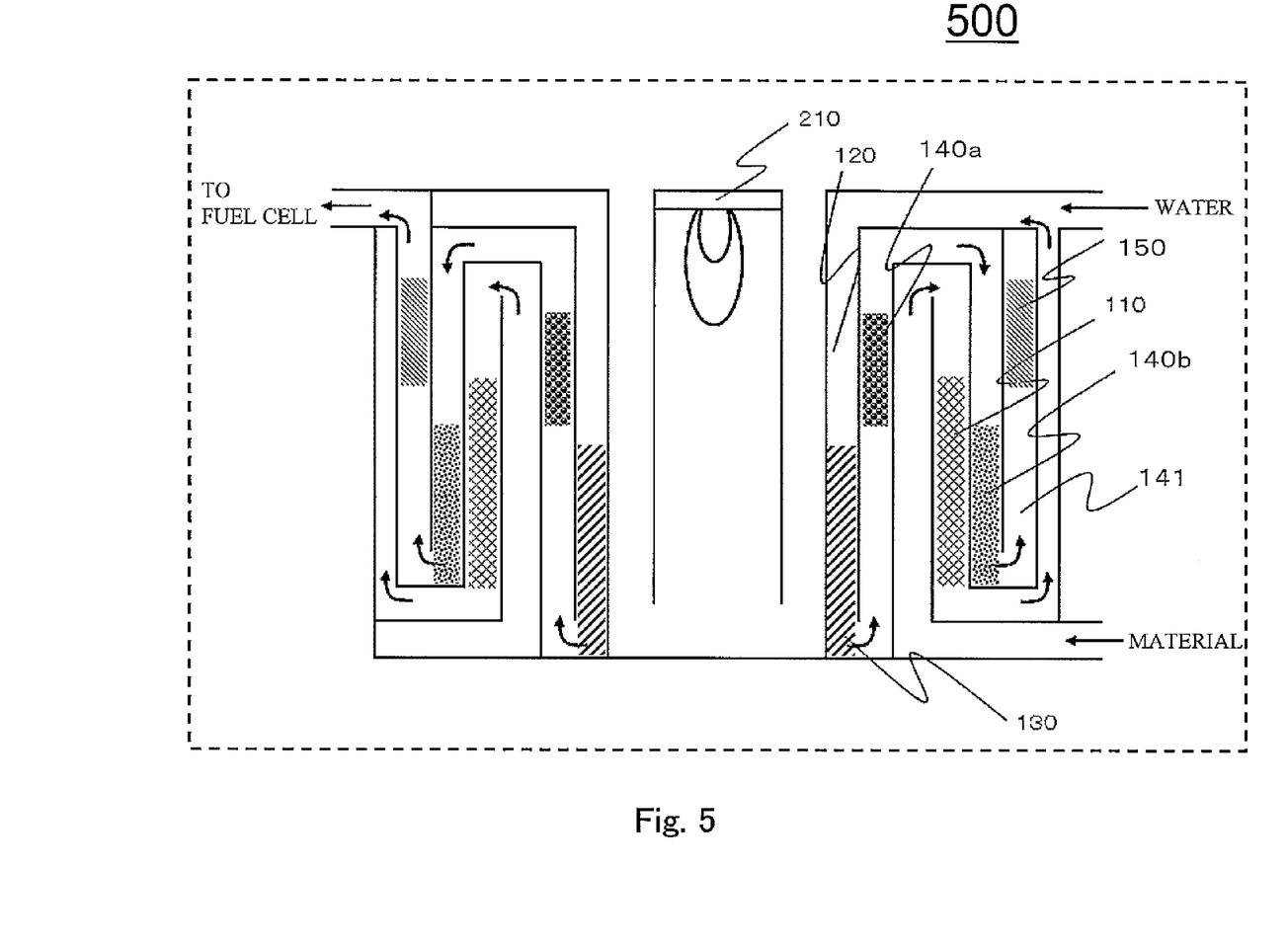
FIG. 5 is a conceptual diagram showing one example of a schematic configuration of the hydrogen generator according to Embodiment 3.

FIG. 5 is a conceptual diagram showing one example of a schematic configuration of a hydrogen generator 500 according to Embodiment 3.

Unlike the hydrogen generator 200 of Embodiment 2, the hydrogen generator 500 according to Embodiment 3 further includes a heater 210, and the hydro-desulfurizer 110 is provided so as to be located between the heater 210 and the second shift converter 140b.

With this configuration, the heat efficiency of the hydrogen generator 500 can be improved, and the increase in the sulfur compound concentration of the hydro-desulfurizer 110 can be suppressed.

To be specific, in the present embodiment, the hydrogen generator 500 includes the heater 210, and the evaporator 120 is provided adjacent to the first shift converter 140a so as to perform heat exchange with the first shift converter 140a. Therefore, the evaporator 120 can use not only the heat of the heater 210 but also the reaction heat of the first shift converter 140a. Thus, the amount of heat generated by the heater 210 can be suppressed, and the heat efficiency of the hydrogen generator 500 can be improved.

In the present embodiment, the hydro-desulfurizer 110 is provided so as to be located between the heater 210 and the second shift converter 140b. With this, since the heater 210 and the second shift converter 140b are provided at an outer periphery of the hydro-desulfurizer 110, the decrease in the temperature of the hydro-desulfurizer 110 can be suppressed. Therefore, the decrease in the reaction efficiency of the hydro-desulfurizer 110 and the increase in the sulfur compound concentration can be suppressed.

Device Configuration

The hydrogen generator 200 according to Embodiment 3 includes the hydro-desulfurizer 110, the evaporator 120, the reformer 130, the first shift converter 140a, the second shift converter 140b, the CO remover 150, and the heater 210.

Examples of the heater 210 include a burner, a flue gas, and a reactor. In the example shown in FIG. 5, the heater 210 is a burner. The heater 210 may be higher in temperature than the second shift converter.

The heater 210 heats the evaporator 120 and the reformer 130. The fuel of the heater 210 may be any fuel. For example, the hydrogen-containing gas discharged from the reformer 130 is used as the fuel of the heater 210.

In the example shown in FIG. 5, the CO remover 150 has a tubular shape. In addition, the hydro-desulfurizer 110 is configured in a circular shape, the heater 210 is provided at the inner periphery side of the hydro-desulfurizer 110, and the second shift converter 140b is provided at the outer periphery side of the hydro-desulfurizer 110.

In the example shown in FIG. 5, the second shift converter 140b is configured in a circular shape, and a passage 141 through which the hydrogen-containing gas having flowed through the second shift converter 140b flows is provided at an outer periphery side of the second shift converter 140b. With this configuration, the heat release of the second shift converter 140b can be suppressed, and the increase in the CO concentration in the shift converter can be suppressed.

Embodiment 3 can be modified in the same manner as Embodiments 1 and 2. Embodiment 3 and Modification Example 1 of Embodiment 2 may be combined. Embodiment 3 and Modification Example 2 of Embodiment 2 may be combined.

Embodiment 4

Figure 6:
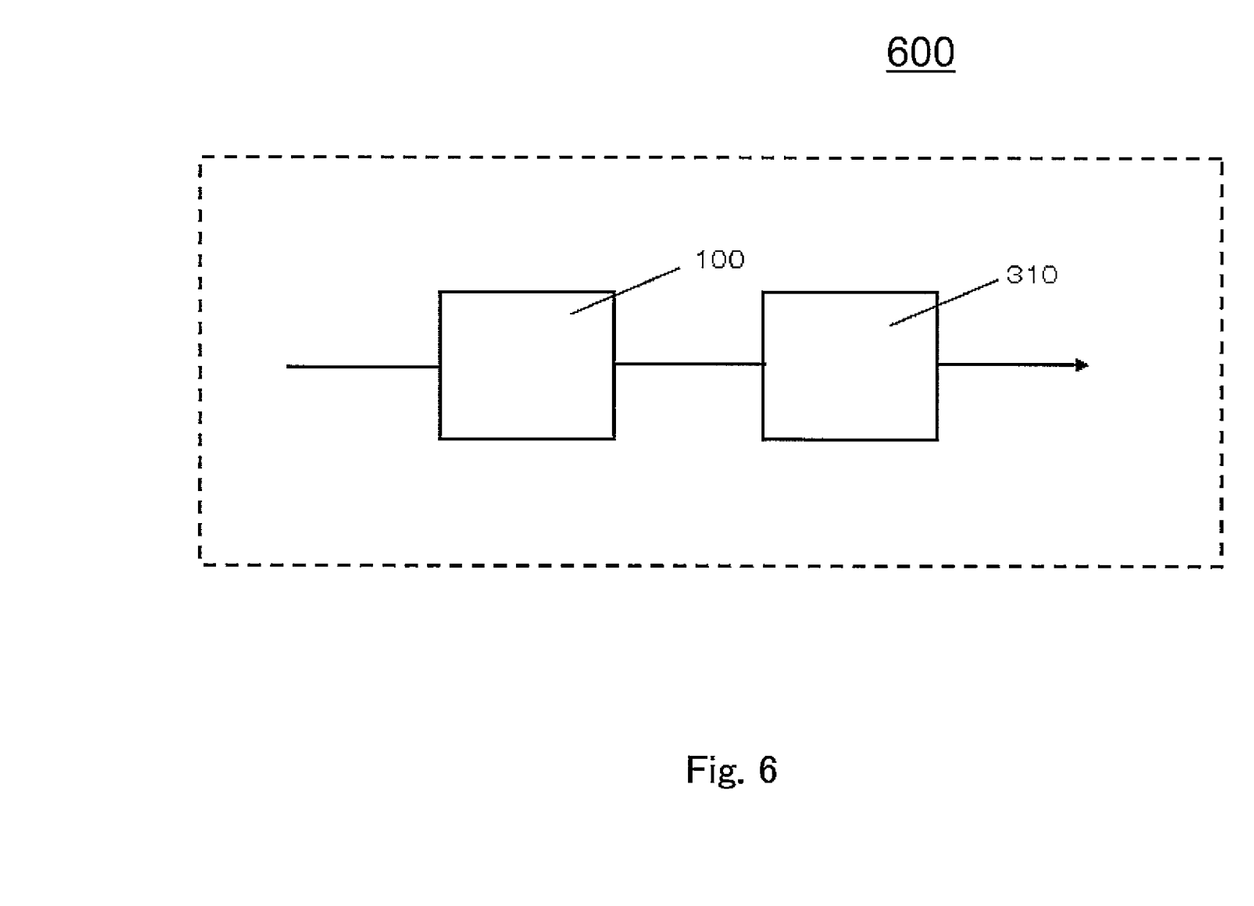
FIG. 6 is a conceptual diagram showing one example of a schematic configuration of a fuel cell system according to Embodiment 4.

FIG. 6 is a schematic diagram showing one example of a schematic configuration of a fuel cell system 600 according to Embodiment 4.

The fuel cell system according to Embodiment 4 includes the hydrogen generator according to any one of Embodiments 1 to 3 and a fuel cell configured to generate electric power using the hydrogen-containing gas supplied from the hydrogen generator.

With this configuration, the temperature gradient of the hydro-desulfurizer becomes more moderate than before, and the hydro-desulfurizer is easily maintained at an appropriate temperature. Therefore, it is possible to provide the fuel cell system that can operate more stably.

System Configuration

The fuel cell system 600 according to Embodiment 4 includes the hydrogen generator 100 of Embodiment 1 and a fuel cell 310.

The fuel cell 310 is a fuel cell configured to generate electric power using the hydrogen-containing gas supplied from the hydrogen generator 100. The fuel cell 310 may be any type of fuel cell. Examples of the fuel cell 310 include a polymer electrolyte fuel cell (PEFC), a solid-oxide fuel cell, and a phosphoric acid fuel cell.

At the time of the electric power generating operation, the fuel cell system 600 generates electric power using the hydrogen-containing gas supplied from the hydrogen generator 100.

Embodiment 4 may be modified in the same manner as Embodiments 1 to 3. Embodiments 4 and 2 may be combined. Embodiment 4 and Modification Example 1 of Embodiment 2 may be combined. Embodiment 4 and Modification Example 2 of Embodiment 2 may be combined. Embodiment 4 and Embodiment 3 may be combined.

From the foregoing explanation, many modifications and other embodiments of the present invention are obvious to one skilled in the art.

Therefore, the foregoing explanation should be interpreted only as an example and is provided for the purpose of teaching the best mode for carrying out the present invention to one skilled in the art. The structures and/or functional details may be substantially modified within the spirit of the present invention.

For example, in the above-described embodiment, the hydro-desulfurizer 110 and the second shift converter 140b contact each other but may be located adjacent to each other with a space therebetween. In addition, a fluid that is higher in temperature than the fluid flowing through the shift converter and the evaporator 120 may flow through this space.

In the above-described embodiment, the material gas having flowed through the hydro-desulfurizer 110 is mixed with water and then flows through the evaporator 120 and the reformer 130. However, the material gas having flowed through the hydro-desulfurizer 110 may be mixed with the steam having flowed through the evaporator 120 and then be introduced to the reformer 130.

INDUSTRIAL APPLICABILITY

Since the temperature gradient of the hydro-desulfurizer becomes more moderate than before, and the hydro-desulfurizer is easily maintained at an appropriate temperature, one aspect of the present invention is useful as a hydrogen generator and a fuel cell system including the hydrogen generator.

REFERENCE SIGNS LIST

100, 200, 300, 400, 500 hydrogen generator
110 hydro-desulfurizer
120 evaporator
130 reformer
140 shift converter
140a first shift converter
140b second shift converter
141 passage
150 CO remover
210 heater
310 fuel cell
600 fuel cell system

The invention claimed is:

1. A hydrogen generator comprising:
a reformer configured to cause a reforming reaction using a material and steam to generate a hydrogen-containing gas;
a shift converter configured to reduce CO in the hydrogen-containing gas by a shift reaction;
an evaporator provided adjacent to the shift converter so as to perform heat exchange with an upstream side of the shift converter and configured to evaporate water; and
a hydro-desulfurizer provided adjacent to the shift converter so as to perform heat exchange with a downstream side of the shift converter and configured to remove a sulfur compound in the material by a hydrodesulfurization reaction,
wherein the hydro-desulfurizer is arranged closer to the downstream side of the shift converter than the upstream side of the shift converter.

2. The hydrogen generator according to claim 1, further comprising a CO remover configured to reduce the CO in the hydrogen-containing gas having flowed through the shift converter, by at least one of a methanation reaction and an oxidation reaction, wherein:
the shift converter includes a first shift converter located at the upstream side and a second shift converter located at the downstream side; and
the hydrogen-containing gas having flowed through the first shift converter performs heat exchange with the evaporator and the CO remover in this order and then flows through the second shift converter.

3. The hydrogen generator according to claim 2, wherein the hydrogen-containing gas having flowed through the first shift converter performs heat exchange with the CO remover and the hydrogen-containing gas, having not yet flowed into the CO remover, in this order and then flows through the second shift converter.

4. The hydrogen generator according to claim 2, wherein the hydrogen-containing gas having flowed through the first shift converter performs heat exchange with the evaporator, the CO remover, and the hydrogen-containing gas, having not yet flowed into the CO remover, in this order and then flows through the second shift converter.

5. The hydrogen generator according to claim 2, further comprising a heater, wherein
the hydro-desulfurizer is provided so as to be located between the heater and the second shift converter.

6. The hydrogen generator according to claim 5, wherein:
the hydro-desulfurizer is configured in a circular shape;
the heater is provided at an inner periphery side of the hydro-desulfurizer; and
the second shift converter is provided at an outer periphery side of the hydro-desulfurizer.

7. The hydrogen generator according to claim 6, wherein:
the second shift converter is configured in a circular shape; and
a passage through which the hydrogen-containing gas having flowed through the second shift converter flows is provided at an outer periphery side of the second shift converter.

8. A fuel cell system comprising:
the hydrogen generator according to claim 1; and a fuel cell configured to generate electric power using the hydrogen-containing gas supplied from the hydrogen generator.

* * * * *